(12) United States Patent
Griffin et al.

(10) Patent No.: US 10,191,306 B2
(45) Date of Patent: Jan. 29, 2019

(54) DITHER FREE BIAS CONTROL

(71) Applicant: Oclaro Technology Limited, Northamptonshire (GB)

(72) Inventors: Robert Griffin, Northamptonshire (GB); Brian L. Heffner, Los Altos, CA (US)

(73) Assignee: OCLARO TECHNOLOGY LIMITED, Northamptonshire (GB)

(*) Notice: Subject to any disclaimer, the term of this patent is extended or adjusted under 35 U.S.C. 154(b) by 0 days.

(21) Appl. No.: 15/549,745

(22) PCT Filed: Feb. 17, 2016

(86) PCT No.: PCT/GB2016/050385
§ 371 (c)(1),
(2) Date: Aug. 9, 2017

(87) PCT Pub. No.: WO2016/132118
PCT Pub. Date: Aug. 25, 2016

(65) Prior Publication Data
US 2018/0031870 A1    Feb. 1, 2018

(30) Foreign Application Priority Data

Feb. 18, 2015 (GB) .................................. 1502729.5

(51) Int. Cl.
*G02F 1/035* (2006.01)
*G02F 1/01* (2006.01)
(Continued)

(52) U.S. Cl.
CPC ............ *G02F 1/0123* (2013.01); *G02F 1/225* (2013.01); *G02F 1/2257* (2013.01);
(Continued)

(58) Field of Classification Search
CPC ...... G02F 1/0123; G02F 1/225; G02F 1/2257; G02F 2001/217; G02F 2203/20; G02F 2001/212; G02F 2201/58; H04B 10/50575
See application file for complete search history.

(56) References Cited

U.S. PATENT DOCUMENTS 6,334,004 B1   12/2001   Ohkuma et al.
6,700,907 B2   3/2004   Schneider et al.
(Continued)

FOREIGN PATENT DOCUMENTS

JP    2014-89336 A    5/2014
WO   WO 2010/100489 A1   9/2010

OTHER PUBLICATIONS

Intellectual Property Office of the United Kingdom, Patents Act 1977: Search Report under Section 17(5) for Application No. GB1502729.5, dated Aug. 3, 2015, 4 Pages.
(Continued)

*Primary Examiner* — Ellen Kim
(74) *Attorney, Agent, or Firm* — Fenwick & West LLP

(57) ABSTRACT

A Mach-Zehnder modulator for modulating optical signals, and comprising: a plurality of modulating waveguide sections; at least one bias electrode in electrical communication with at least one modulating waveguide section and configured to apply at least one electrical bias signal to one or more of the modulating waveguide sections; and an output optical combiner comprising a plurality of inputs and a plurality of outputs, wherein the plurality of inputs of the combiner are in optical communication with output sides of the plurality of modulating waveguide sections, and wherein a plurality of the outputs of the combiner are monitor outputs.

33 Claims, 8 Drawing Sheets

(51) Int. Cl.
   *G02F 1/225* (2006.01)
   *H04B 10/50* (2013.01)
   *G02F 1/21* (2006.01)

(52) U.S. Cl.
   CPC . *H04B 10/50575* (2013.01); *G02F 2001/212* (2013.01); *G02F 2001/217* (2013.01); *G02F 2201/58* (2013.01); *G02F 2203/20* (2013.01)

(56) References Cited

U.S. PATENT DOCUMENTS

| | | | |
|---|---|---|---|
| 7,633,988 B2 | 12/2009 | Fish et al. | |
| 7,916,377 B2 | 3/2011 | Witzens et al. | |
| 7,991,299 B2 | 8/2011 | Ota et al. | |
| 8,050,555 B2 | 11/2011 | McBrien | |
| 8,098,998 B2 | 1/2012 | Takashima et al. | |
| 8,184,991 B2 | 5/2012 | Farina et al. | |
| 8,493,647 B2 | 7/2013 | Fujisaku | |
| 8,532,499 B2 | 9/2013 | Canton et al. | |
| 8,543,010 B2 | 9/2013 | Zhou et al. | |
| 8,620,116 B2 | 12/2013 | Uesaka et al. | |
| 8,625,935 B2 | 1/2014 | Mekis et al. | |
| 8,660,388 B2 | 2/2014 | Seki et al. | |
| 8,693,810 B2 | 4/2014 | Suarez et al. | |
| 9,454,059 B1* | 9/2016 | Nagarajan | H04B 10/25 |
| 2009/0201564 A1 | 8/2009 | Tian et al. | |
| 2011/0129232 A1 | 6/2011 | Dou et al. | |
| 2011/0305414 A1 | 12/2011 | Mekis et al. | |
| 2013/0064492 A1 | 3/2013 | Ishikawa et al. | |
| 2013/0136388 A1 | 5/2013 | Uesaka et al. | |
| 2014/0001347 A1* | 1/2014 | Nagarajan | G02B 5/30 250/225 |
| 2014/0307996 A1 | 10/2014 | Kono | |
| 2016/0127070 A1* | 5/2016 | Nagarajan | G02F 1/025 398/82 |

OTHER PUBLICATIONS

Patent Cooperation Treaty, International Search Report and Written Opinion of the International Searching Authority, International Patent Application No. No. PCT/GB2016/050385, dated May 19, 2016, 14 Pages.

\* cited by examiner

DITHER FREE BIAS CONTROL

RELATED APPLICATIONS

This application is a 35 U.S.C. 371 national stage filing of International Application No. PCT/gb2016/050385, filed on Feb. 17, 2016, which claims priority from United Kingdom Application No. GB1502729.5 filed on Feb. 18, 2015. The contents of the aforementioned applications are hereby incorporated by reference in their entireties.

TECHNICAL FIELD

The invention relates to biasing of optical modulators. More specifically, the invention relates to, but is not limited to, biasing of Mach-Zehnder optical modulators.

BACKGROUND

In this specification the term "light" will be used in the sense that it is used in optical systems to mean not just visible light, but also electromagnetic radiation having a wavelength outside that of the visible range.

It is well-known to control the bias setting of a Mach-Zehnder (MZ) modulator by adding a "tone" to the modulator bias having a low frequency that can be detected using photodetectors and electronics operating at speeds much lower than the modulation, allowing for low noise and low cost. This low frequency tone is input to the modulator and monitored by a photodetector (PD) at an output of the modulator as an average and the bias voltage of the modulator is adjusted until a minimum optical output is found. The tone applied to the modulator increases and decreases the bias voltage such that a minimum optical output can be found when the output measured by the PD rises with either an increase or a decrease in bias voltage. This process is termed "dithering" of the bias voltage.

Alternatives to the method of dithering the bias voltage are known as set out, for example in U.S. Pat. No. 6,700,907, in which a controller executes interleaved DC bias and gain control routines using monitored values of the monitored photocurrent output signal of a MZ laser modulator to derive a gain setting for the modulation drive signal and a bias level setting for the DC bias level.

There is presently a market need to reduce the power consumption of devices such as indium phosphide (InP) modulators and so there is a desire to use lower drive voltages for those modulators. The signal from a modulator driven at a lower amplitude may be amplified by a semiconductor optical amplifier (SOA) in order to reach the required line transmission power. Overall the combination of low power driven MZs and an SOA results in a device consuming less power and radiating less heat. Lower drive voltages result in a lower amplitude of signal at the output of the MZ and so, when a dither tone is used to control the bias point, the amplitude of the tone can become significant relative to the output signal and cause transmission problems.

Broadly, the prior art uses a control system to place a monitor PD operating point at a minimum for phase modulation (or maximum for a complementary output). The control system could use hill-climbing or dithering to find the maximum/minimum. In any case, the system requires some movement off the ideal operating point to detect the maximum/minimum.

SUMMARY

According to the invention in a first aspect, there is provided a MZ modulator for modulating optical signals, and comprising: a plurality of modulating waveguide sections; at least one bias electrode in electrical communication with at least one modulating waveguide section and configured to apply at least one electrical bias signal to one or more of the modulating waveguide sections; and an output optical combiner comprising a plurality of inputs and a plurality of outputs, wherein the plurality of inputs of the combiner are in optical communication with output sides of the plurality of modulating waveguide sections, and wherein a plurality of the outputs of the combiner are monitor outputs.

It is noted that "electrical communication" encompasses any means for passing of electrically encoded data. Electrical communication may be a wired or wireless communication link and may utilise any communications protocol known to those skilled in the art.

It is further noted that "optically coupled" encompasses any means by which optically encoded data may be transferred between elements. Optical coupling may be provided by a waveguide or similar transmission medium, or may be provided over a gap between elements. The gap may be in air, another gas or a vacuum.

Optionally, a bias signal determiner is configured to determine an error in the at least one electrical bias signal based on a signal received from the plurality of monitor outputs of the combiner.

Optionally, the bias signal determiner is configured to determine the error based on a difference between two of the monitor outputs of the combiner.

Optionally, the combiner is an n×n combiner and n is greater than 2.

Optionally, the combiner is a 3×3 combiner, and wherein one of the plurality of inputs of the 3×3 combiner is in optical communication with a combined output of the modulating waveguide sections.

Optionally, a further n×n combiner comprises a plurality of inputs and a plurality of outputs, wherein a plurality of the inputs of the further combiner are in optical communication with one or more of the monitor outputs of the combiner, and wherein the bias signal generator is configured to determine the error in the at least one electrical bias signal based on a signal received from the plurality of outputs of the further coupler.

Optionally, the modulator is an I & Q modulator arrangement comprising a plurality of MZ modulators described above nested within an outer MZ structure, wherein the bias signal determiner is configured to determine an error in each of an I and a Q electrical bias signal.

Optionally, the outer MZ structure comprises an optical combiner having a plurality of monitor outputs for determining an error in the outer phase electrical bias signal.

Optionally, the modulator comprises four modulating waveguide sections, wherein the output optical combiner comprises four inputs and each of the modulating waveguide sections is in optical communication to an input of the combiner.

Optionally, the combiner comprises four outputs.

Optionally, the bias signal determiner is configured to determine the error in at least one electrical bias signal based on:

$$\varepsilon = A(p-s)$$

wherein $\varepsilon$ is a vector of an error in the electrical bias signal, A is a detector matrix determined during a calibration of the modulator, p comprises a vector of the outputs of the further combiner.

Optionally, p comprises the vector of the outputs of the further combiner divided by the sum of those outputs and s is a set point vector determined during a calibration of the modulator.

Optionally, the bias signal determiner is configured to determine the vector s while the bias signals are set to optimize the output of the modulator.

Optionally, the bias signal determiner is configured to determine the matrix A by determining p−s while the bias signals are set to each of three linearly independent sets of bias conditions and determining a pseudo inverse by:

$$A = [\varepsilon_1 \quad \varepsilon_2 \quad \varepsilon_3][v_1 \quad v_2 \quad v_3]^{-1} = \begin{bmatrix} dI & 0 & 0 \\ 0 & dQ & 0 \\ 0 & 0 & dP \end{bmatrix}[v_1 \quad v_2 \quad v_3]^{-1}.$$

Optionally, the outputs of the further combiner are measured using at least one photodetector configured to transmit the measured signals to the bias signal determiner.

Optionally, the combiner is in optical communication with the further combiner via at least one trimmer.

Optionally, the coupler and/or the further coupler comprises a multimode interference, MMI, coupler.

A Mach-Zehnder modulator may comprise a plurality of nested modulators according to any preceding claim.

According to the invention in another aspect, there is provided a method for determining an error in at least one electrical bias signal in a Mach-Zehnder modulator, the modulator comprising a plurality of modulating waveguide sections and at least one bias electrode in electrical communication with at least one modulating waveguide section and configured to apply at least one electrical bias signal to one or more of the modulating waveguide sections, the method comprising: receiving an optical signal at an output optical combiner in optical communication with output sides of the plurality of modulating waveguide sections and propagating the optical signal through the combiner to a plurality of outputs thereof; providing an optical output of the modulator at one output of the combiner and a plurality of monitor outputs at a plurality of the remainder of the plurality of outputs of the combiner; and determining an error in the at least one electrical bias signal based on the received monitor outputs.

Optionally, the error in the at least one electrical bias signal is determined at a bias signal generator.

Optionally, the bias signal determiner determines the error based on a difference between two of the monitor outputs of the combiner.

Optionally, the combiner is a 3×3 combiner, and wherein the optical signal is received at one of the plurality of inputs of the 3×3 combiner from a combined output of the modulating waveguide sections.

Optionally, the method further comprises receiving the plurality of monitor outputs at a plurality of inputs of a further combiner, propagating the remaining optical signals to a plurality of outputs thereof and determining, by the bias signal generator, the error in the at least one electrical bias signal based on a signal received from the plurality of outputs of the further combiner.

Optionally, the modulator is an I & Q modulator arrangement comprising a plurality of modulators nested within an outer MZ modulator structure, an in phase, I, bias electrode and a quadrature phase, Q, bias electrode, the bias signal determiner determining an error in the I and Q electrical bias signals.

Optionally, the outer MZ structure comprises an optical combiner having a plurality of monitor outputs and a phase bias electrode, the bias signal determiner determining an error in the phase electrical bias signal based on the plurality of monitor outputs.

Optionally, the modulator comprises four modulating waveguide sections, and wherein the output optical combiner comprises four inputs and each of the modulating waveguide sections is in optically communication with an input of the combiner.

Optionally, the combiner comprises four outputs.

Optionally, the bias signal determiner determines the error in at least one electrical bias signal based on:

$$\varepsilon = A(p-s)$$

wherein $\varepsilon$ is a vector of an error in the electrical bias signal, A is a detector matrix determined during a calibration of the modulator, p comprises a vector of the outputs of the further combiner.

Optionally, p comprises the vector of the outputs of the further combiner divided by the sum of those outputs and s is a set point vector determined during a calibration of the modulator.

Optionally, the bias signal determiner determines the vector s while the bias signals are set to optimize the output of the modulator.

Optionally, the bias signal determiner determines the matrix A by determining p−s while the bias signals are set to each of three linearly independent sets of bias conditions and determining a pseudo inverse by:

$$A = [\varepsilon_1 \quad \varepsilon_2 \quad \varepsilon_3][v_1 \quad v_2 \quad v_3]^{-1} = \begin{bmatrix} dI & 0 & 0 \\ 0 & dQ & 0 \\ 0 & 0 & dP \end{bmatrix}[v_1 \quad v_2 \quad v_3]^{-1}.$$

Optionally, the remaining optical signals output from the further combiner are measured using at least one photodetector, the measured signals being transmitted to the bias signal determiner.

Optionally, the combiner is in optical communication with the further combiner via at least one trimmer.

According to the invention in another aspect, there is provided a computer program comprising instructions which, when executed on at least one processor, cause the at least one processor to carry out any of the methods described above.

According to the invention in another aspect, there is provided a carrier containing the computer program, wherein the carrier is one of an electronic signal, optical signal, radio signal, or non-transitory computer readable storage medium.

BRIEF DESCRIPTION OF DRAWINGS

Exemplary embodiments of the invention are disclosed herein with reference to the accompanying drawings, in which.

DETAILED DESCRIPTION

Generally, disclosed herein are methods and apparatus permitting better control-system signal to noise ratios for modulators using low drive voltages. A conventional, fully-driven modulator requires a peak-to-peak drive swing of 2Vπ (see below), whereas a similar modulator might be driven with a swing of only 0.1 to 0.6 Vπ when using the methods and apparatus disclosed herein. For example, a differentially-driven, 32 Gb/s indium phosphide modulator may have a Vπ of 1.6 volts single-ended (Vse), in which case a low drive swing would be in the range 0.16 to 0.96 Vse. Methods and apparatus disclosed herein allow use of mid-range signals for feedback instead of maximum or minimum signals. In particular exemplary methods and apparatus a coupler for coupling modulating waveguide sections of a MZ modulator comprises a modulator output and a plurality of monitor outputs. This allows a bias voltage for the modulator to be determined based on a difference between the monitor outputs. In particular methods and apparatus the use of mid-range signals for feedback may come at a cost of more PDs. Deviation from the calibrated mid-range point provides a signed error without hill-climb or dither, allowing a simpler, 'quieter' control system that can sit at its ideal point without needing to search the vicinity using dither or hill-climbing.

Figure 1:
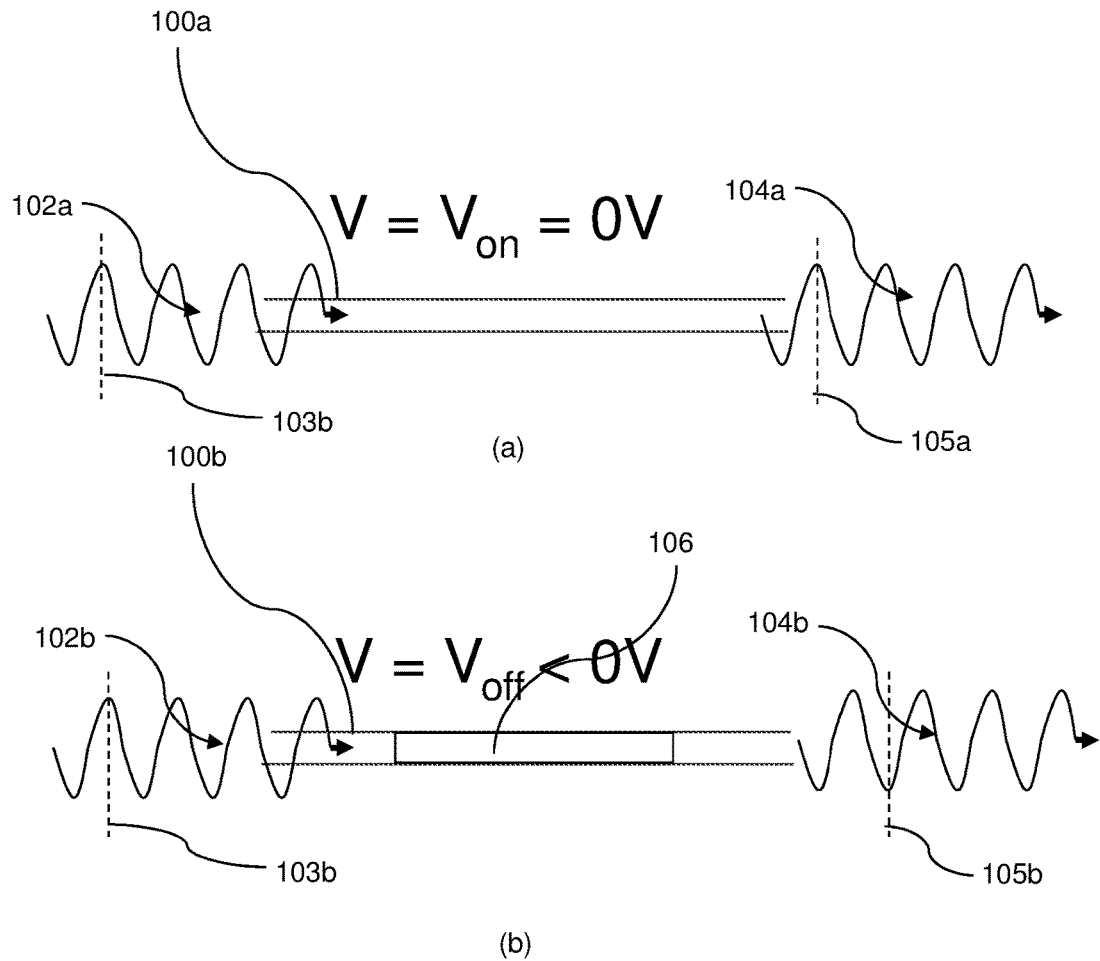
FIGS. 1a and 1b are schematic representations of a modulating waveguide section showing the principles of a MZ modulator.

FIGS. 1a and 1b are schematic diagrams showing the basic principle in operation in a Mach-Zehnder modulator. The material in a waveguide 100a, 100b is configured to alter the refractive index of the material with changes to a voltage (or electric field) applied to the material. A modulator may comprise a waveguide 100a, 100b as well as an electrode to apply a modulating voltage (not shown).

In FIG. 1a, no modulating voltage is applied to the waveguide 100a and an input optical signal 102a passes through the waveguide 100a unaffected, as there is no change in refractive index of the material. An output optical signal 104a is therefore substantially equal in phase to the input optical signal 102a. This is shown by the dashed lines 103a, 105a, which are located at the same position on the waveform of the input optical signal 502a and output optical signal 504a. In the exemplary EO modulator 100a of FIG. 1a, the modulating voltage V is set to $V_{on}$, which is equal to zero volts.

In FIG. 1b, a modulating voltage is applied to the electrode of the modulator 100b, such that the waveguide 100b is "reverse biased" in the region 106. This has the effect of changing the refractive index of the material in the region 106. Therefore, the phase of an input optical signal 102b is changed as it passes through the waveguide 100b. This is shown by the dashed lines 103b, 105b, which are located at different positions on the waveforms of the input optical signal 102b and output optical signal 104b. In the exemplary EO modulator 100b of FIG. 1b, the modulating voltage V is set to $V_{off}$, which is less than zero volts.

Figure 2:
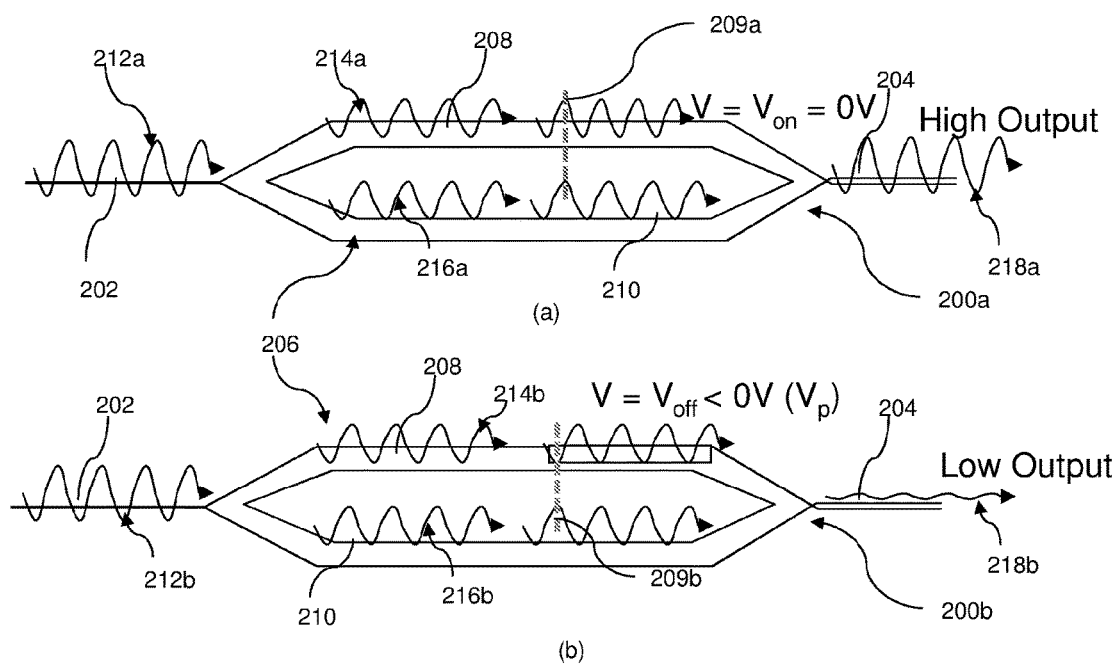
FIGS. 2a and 2b are schematic representations of a MZ modulator.

FIGS. 2a and 2b show schematic diagrams of an exemplary MZ modulator 200a, 200b under different bias conditions.

The modulator 200a, 200b comprises an input waveguide section 202 and an output waveguide section 204. The input 202 and output 204 waveguide sections are in optical communication via a modulating waveguide section 206. The modulating waveguide section 206 comprises first and second waveguides 208, 210 configured to split an input optical signal 212a, 212b. The input signal 212a, 212b is split such that a first portion 214a, 214b of the input signal 212a, 212b is propagated through the first waveguide 208 and a second portion 216a, 216b of the input signal 212a, 212b is propagated through the second waveguide 210. The first and second portions 214a, 214b, 216a, 216b of the input signal 212a, 212b are recombined to form an output signal 218a, 218b, which is output from the output waveguide section 204. This is a general arrangement of a MZ modulator. The splitting of the input optical signal 212a, 212b and the recombination into an the output signal 218a, 218b may be undertaken by a coupler.

Referring to FIG. 2a, the input optical signal 212a enters the input waveguide section 202. The input optical signal may have been emitted from a laser diode. The input signal 212a is split into first and second portions 214a, 216a that are propagated through first and second waveguides 208, 210 of the modulating waveguide section 206. The first and second portions 214a, 216a of the signal are recombined at the output waveguide section 204 to form the output signal 218a.

At least one electrode is located on the first waveguide and is configured to apply a modulating voltage. The modulating voltage is set to $V_{on}$, which in this example is equal to zero volts. The modulator 200a, or, more specifically, the first waveguide 208, is therefore unbiased. As a result, there is no change in the refractive index of the first waveguide section 214a. Both the first and second portions 214a, 216a of the optical signal therefore propagate through the first and second waveguide sections 208, 210 with no change in phase. This can be seen by the dotted line 209a, which illustrates that the signals 214a, 216a are in phase. When the portions 214a, 216a of the optical signal are recombined, they constructively interfere with each other to produce an output optical signal 218a substantially equal to the input optical signal 212a, neglecting normal phase changes and losses experienced in a waveguide.

Referring to FIG. 2b, the modulating voltage is set to $V_{off}$, which in this example is less than zero volts. As a result, the modulator 200b, or, more specifically, the first waveguide 208, is reverse biased. This has the effect of changing the refractive index of the semiconductor material in the first waveguide portion 208. The change in the refractive index of the first waveguide 208 results in a phase shift being applied to the first portion 214b of the optical signal. Therefore, the first and second portions 214b, 216b of the optical signal are out of phase when each of them reaches the end of the first or second waveguide portions 208, 210 respectively. This is shown by the dashed line 209b, which illustrates that the first and second portions 214b, 216b of the optical signal are out of phase. A change in voltage required to transition between the conditions of maximum 218a and minimum 218b modulator output power may be referred to as Vπ ($V_{pi}$).

When the first and second portions 214b, 216b of the optical signal are recombined in the output waveguide section 204, they interfere with each other to produce an output optical signal 218b different to the input optical signal 212b. In the exemplary modulator 200b of FIG. 2b, the output optical signal 218b has a smaller amplitude when compared to the input optical signal 212b.

By biasing a modulator midway between the conditions described in FIG. 2a and FIG. 2b, and applying a modulating signal with a swing of Vπ to the modulator's electrodes, the output optical signal 218a, 218b may be amplitude modulated to carry data. Similarly, by biasing a modulator at the null conditions described in FIG. 2b, and applying a modulating signal with a swing of 2Vπ to the modulator's electrodes, the output optical signal 218a, 218b may be phase modulated to carry data.

Figure 3:
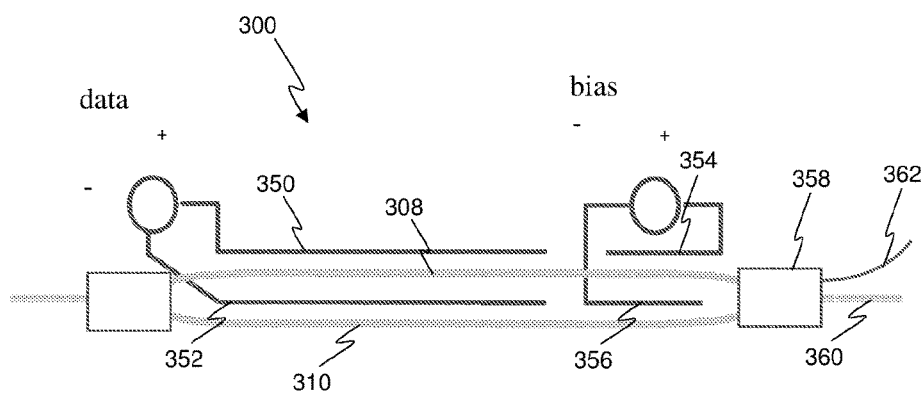
FIG. 3 is a schematic representation of a MZ modulator.

In practical implementations of a MZ modulator 300, as shown in FIG. 3, data electrodes 350, 352 may be in electrical communication with both the first 208 and second 210 waveguides. The two electrodes may then be used in conjunction to apply a total modulating voltage. That is, the total modulating voltage for the modulator 300 is the sum of the modulating voltages applied by each electrode. Further, it is noted that manufacturing tolerances may result in the first 208 and the second 210 waveguides having different properties. Therefore, additional bias electrodes 354, 356 may be in electrical communication with the first 208 and second 210 waveguides to bias the modulator correctly.

The modulator 300 also comprises an output coupler 358. The coupler 358 comprises two inputs that are each in optical communication with modulating waveguide sections 308, 310. The coupler 358 also comprises two outputs 360, 362. A first output 360 is the output of the modulator 300 and a second output 362 is a monitor output that is a complimentary signal to the output signal 460 (i.e. 180 degrees out of phase) and that is used to determine a bias voltage for the bias electrodes 354, 356. This is typically done using dithering.

Figure 4:
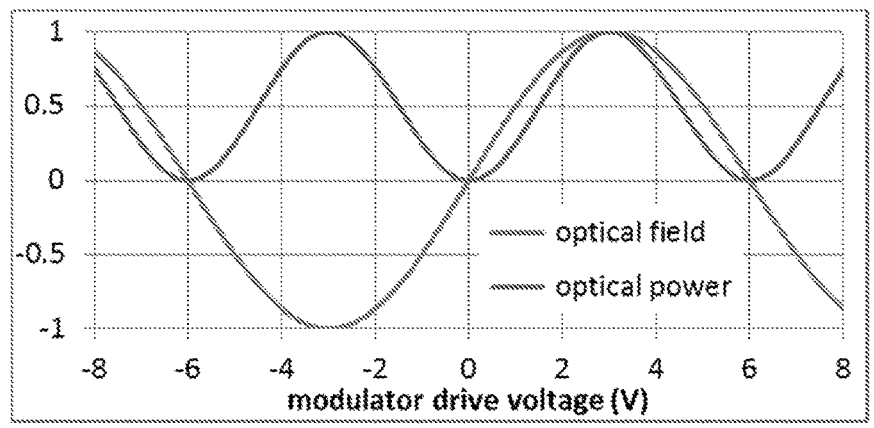
FIG. 4 is a plot of optical field strength and optical power of a MZ modulator against modulator drive voltage.

FIG. 4 shows a plot of optical field strength and optical power of an MZ modulator against modulator drive (or bias) voltage. In the exemplary plot of FIG. 4, the bias voltage may be set at zero volts so that the modulator operates in the range where the optical field varies linearly on either side of zero volts and an AC coupled data signal swings the output optical field of the modulator between positive and negative.

In this configuration, an AC coupled data signal of any amplitude will result in phase modulation of the optical output. However, as the data signal swing is reduced, the optical output power falls rapidly and the signal-to-noise ratio of the dither feedback signal degrades. Optical amplification, e.g. by a semiconductor optical amplifier or an erbium-doped fibre amplifier, can recover the power lost at the main optical output, albeit with some degradation in optical signal-to-noise ratio. However, placing optical amplifiers before the control-system photodetectors that detect the dithers may require increases in device size, complexity and cost; may dissipate substantial power; and/ or may yield control system signals degraded by the amplification process.

Figure 5:
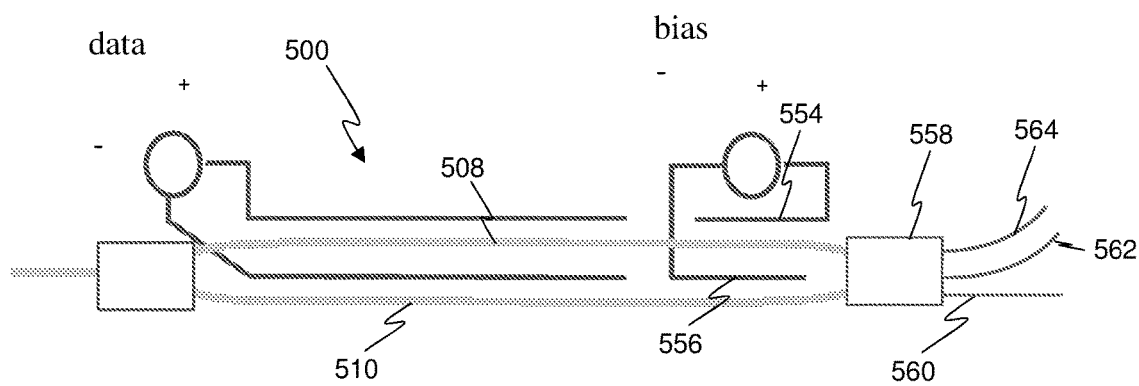
FIG. 5 is a schematic representation of a MZ modulator.

FIG. 5 shows a schematic diagram of a MZ modulator 500. Many of the features of the modulator 500 are the same or similar to the features of the modulator 300 shown in FIG. 3 and are not explained in detail again here. Such features are given corresponding reference numerals.

The modulator 500 comprises a coupler 558 at the output of the modulator 500. The coupler is configured to receive optical signals from the modulating waveguide sections 508, 510 and to have a plurality of monitor outputs 562, 564. The two monitor outputs 562, 564 are not complimentary to the modulator output 560, but are each 90 degrees out of phase on either side of the modulator output 560. Therefore, the difference between the two monitor outputs 562, 564 provides information on the modulator output 560. This may be used to determine the correct bias signal for the biasing electrodes 554, 556. In exemplary methods and apparatus, the modulator output 560 may be considered to be at a minimum, when the difference between the monitor outputs 562, 564 is zero. The biasing signals may therefore be determined so as to keep the difference between the monitor outputs 562, 564 at zero. There is no need for dithering. In other exemplary MZ modulators, an output coupler may comprise more than two monitor outputs.

Figure 6:
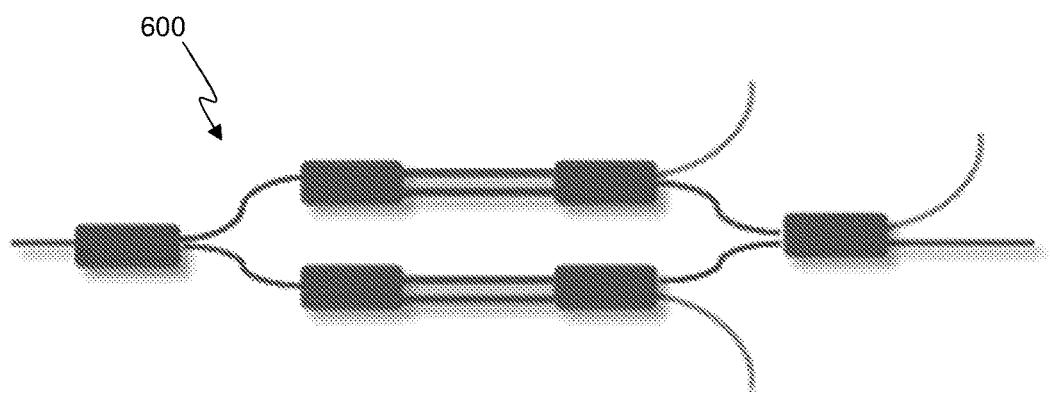
FIG. 6 is a schematic representation of an I & Q MZ modulator.

FIG. 6 shows an I&Q MZ modulator 600 in which two MZ modulators as shown in FIG. 3 have been nested. That is, two MZ modulators 300 are arranged in parallel such that a first modulator is in phase (I) and a second modulator is in quadrature phase (Q). In dithered biasing arrangements, the I and Q bias voltages are dithered to find the minimum average output power for the I & Q modulator 600. A phase (P) bias voltage may also be applied at the output of each of the I and Q modulators. In dithered biasing arrangements, the P bias voltage is dithered to minimize radio frequency (RF) interference between the I and Q modulators.

Figure 7:
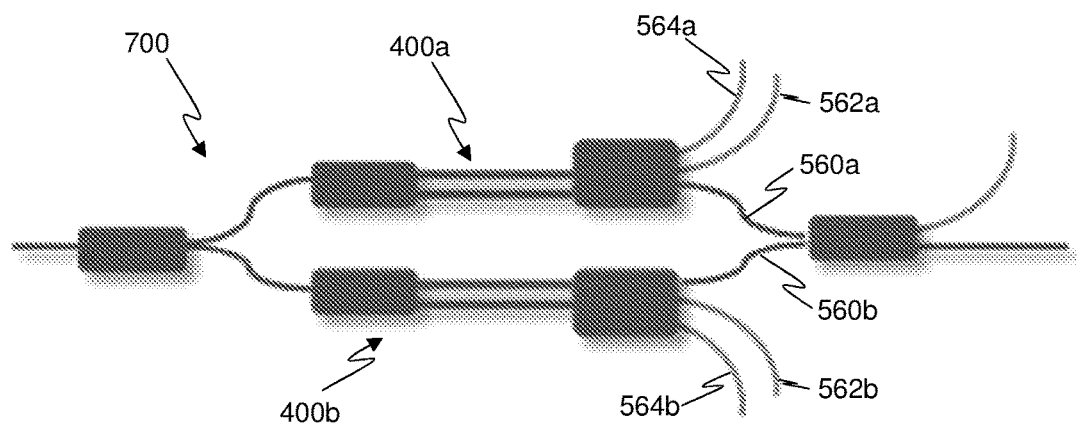
FIG. 7 is a schematic representation of an I & Q MZ modulator.

FIG. 7 shows an I&Q MZ modulator 700 comprising a plurality of nested MZ modulators 400a, 400b. The principle of operation of each of the plurality of the MZ modulator is similar or the same as to that of the MZ modulator 400 in that each comprises a plurality of monitor outputs 562a, 564a, 562b, 564b. A difference between corresponding pairs of the plurality of monitor outputs 562a, 564a, 562b, 564b may be used to determine when the modulator outputs 560a, 560b are at a minimum and therefore used to determine biasing voltages.

Figure 8:
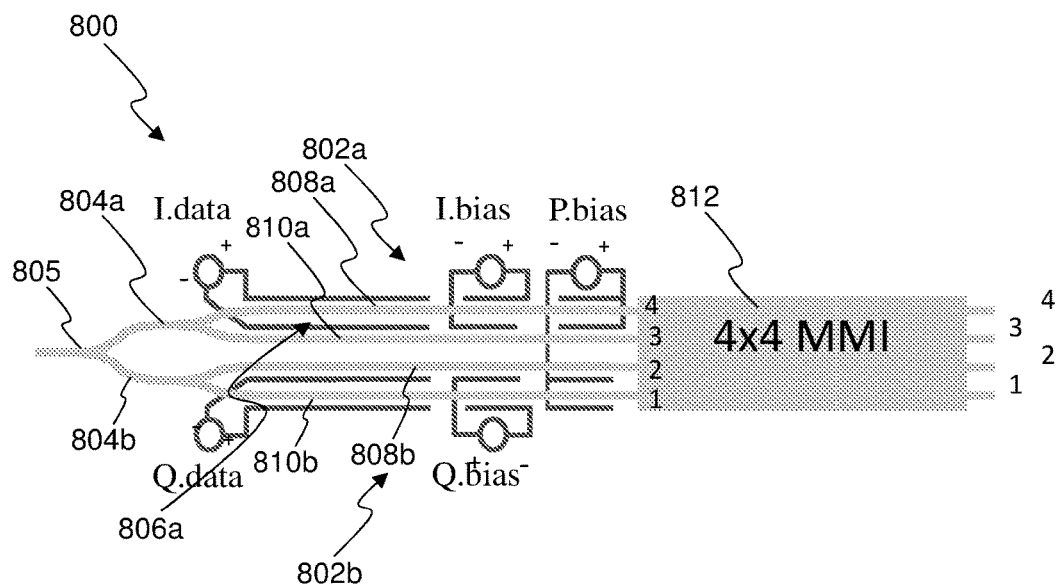
FIG. 8 shows a schematic representation of an I & Q MZ modulator.

FIG. 8 shows an exemplary I & Q MZ modulator 800 comprising similar features to those in the MZ modulator of FIG. 3. A first (in phase) MZ modulator 802a is configured in parallel with a second (quadrature phase) MZ modulator 802b. A description of the modulator 800 is provided in relation to the first (I) MZ modulator 802a, but it is noted that the same description may generally apply to the second (Q) modulator 802b and reference numerals will reflect this with a suffix of 'b', as opposed to 'a'.

As explained with reference to FIG. 3, the first MZ modulator 802a comprises an input waveguide section 804a and a modulating waveguide section 806a. The modulating waveguide section 806a comprises first and second waveguides 808a, 810a configured to split an input optical signal. The input signal is split such that a first portion of the input signal is propagated through the first waveguide 808a and a second portion of the input signal is propagated through the second waveguide 810a. Similar features are present in the second MZ modulator 802b. In addition, a common input waveguide section 805 is configured to receive an input signal and to split the input signal into the input waveguide sections 804a, 804b of the MZ modulators 802a, 802b.

The I & Q MZ modulator 800 also comprises a multimode interference (MMI) coupler 812. In the exemplary I & Q MZ modulator 800 of FIG. 8, the MMI coupler is a 4×4 (i.e. four inputs and four outputs) MMI coupler, although other exemplary MZ modulators may comprise other configurations of MMI coupler.

Each of the first and second modulating waveguide sections 808a, 808b, 810a, 810b of the I & Q MZ modulator 800 is optically coupled to an input of the MMI coupler 812. The inputs of the MMI coupler may be considered to be inputs 1-4, in which case the following optical coupling may be used:

Second modulating waveguide 810b of second MZ 802b→input 1
First modulating waveguide 808b of second MZ 802b→input 2
Second modulating waveguide 810a of first MZ 802a→input 3
First modulating waveguide 808a of first MZ 802a→input 4

Using such a configuration, the outputs of the MMI coupler 812 can also be numbered 1-4. The numbers of the inputs and the outputs of the MMI coupler 812 are shown in FIG. 8.

Figure 9:
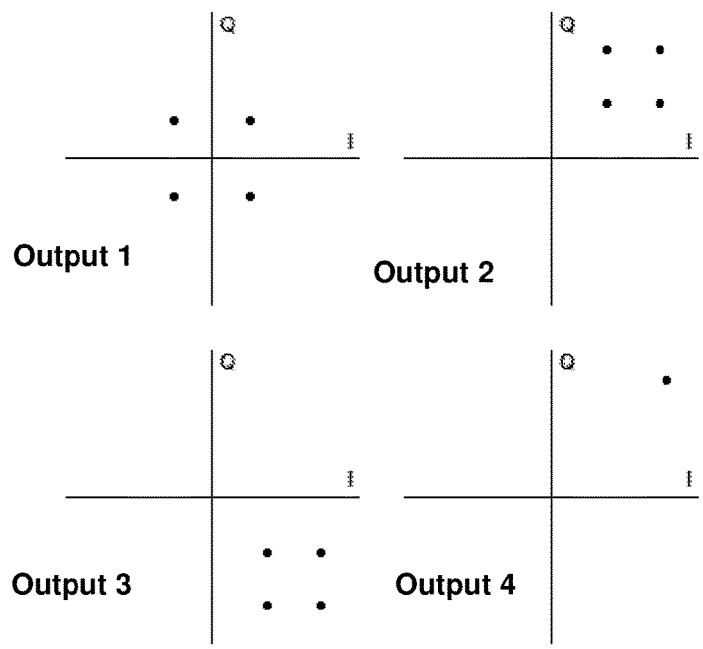
FIG. 9 shows constellation plots for each of four outputs from a multimode index coupler of a MZ modulator.

FIG. 9 shows constellation plots for each of the outputs 1-4 of the MMI coupler 712. Output 1 is an output signal for the modulator and outputs 2-4 are monitor outputs, which may be used to determine an error in the biasing of the modulator. For an introduction to constellation diagrams, see http://en.wikipedia.org/wiki/Constellation_diagram. The cosine and sine components of the optical electric field are plotted along the x and y axes, respectively, at sampling times for the detected symbols. Considering the port 1 output only, the four dots of the constellation plot show the fields representing the four different symbols of I & Q.

FIG. 9 shows that the modulator of FIG. 8 can be biased so that MMI output 1 produces the desired I & Q modulation. Therefore, output 1 can be used as the output for the modulator. Under this same bias condition, the outputs 2, 3, and 4 do not produce useful modulation outputs, but one or more of them can be used for bias control. For example, the outputs 1-4 may be optically coupled to PDs such that bias signals may be extracted. Exemplary methods and apparatus may use low-speed PDs for economy and low noise. These PDs might have a frequency response from DC to around 1 MHz and would not see the GHz modulation.

Output 1 comprises the optical output required for the I & Q MZ modulator 800, i.e. the constellation at output 1 is in the form required for I & Q. Outputs 2-4 comprise information relating to bias errors of the modulator 700, or to put it another way, outputs 2-4 change as the bias is changed. Therefore, the output of the modulator 800 may be taken from output 1 of the MMI coupler 812 and the bias voltages of the modulator 812 may be determined based on one or more of the remaining outputs.

An MMI coupler relies on simple diffraction in a slab waveguide to yield a desired set of amplitude and phase relationships between input and output optical fields.

Figure 10:
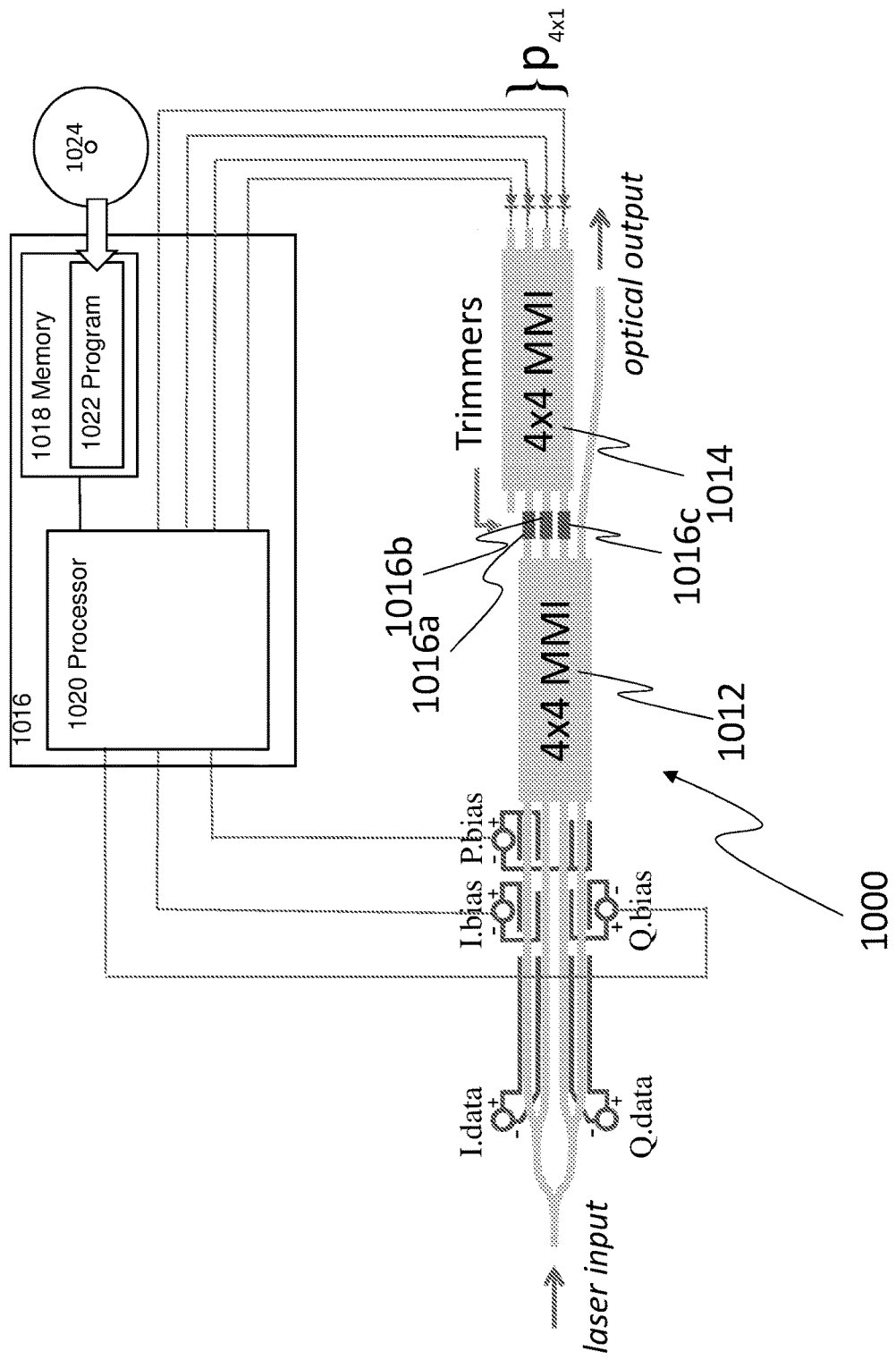
FIG. 10 shows a schematic representation of an I & Q MZ modulator.

FIG. 10 shows an exemplary I & Q MZ modulator 1000. The optical output of the modulator 1000 is taken from output 1 of a first MMI coupler 1012 that is optically coupled to the first and second modulating waveguide sections, as explained above in relation to FIG. 8. The modulator 1000 further comprises a second MMI coupler 1014 that is optically coupled to the outputs 2-4 of the first MMI coupler 1012. In the exemplary modulator 1000 of FIG. 10, the outputs 2-4 of the first MMI coupler 1012 are optically coupled to the inputs 1-3 (as defined above) of the second MMI coupler 1014.

The first MMI coupler 1012 may be optically coupled to the second MMI coupler 1014 via one or more trimmers 1016a-c. The trimmers 1016a-c are optional. The trimmers 1016a-c may be used to improve production yield by adjusting the transmission phase and/or loss of each trimmer to improve the condition number (see below) after the MMI couplers and waveguides are fabricated. The trimmers 1016a-c may be omitted if an optimized mask design and repeatable production process results in an adequate yield of devices with acceptable condition number.

In FIG. 10 the trimmers 1016a-c are shown as three short single-mode waveguides connecting the first MMI coupler 1012 and the second MMI coupler 1014. The amplitude and phase of the transmitted light will be affected by propagation though each of these three waveguides. Changes in the relative amplitudes and phases of the three signals propagated through the phase trimmers 1016a-c on arrival at the second MMI coupler 1014 will change a detector matrix A (see below). If, through calibration, A is determined to have a high condition number (see below), one or more of the amplitude or phase of one or more of the three signals propagating through the trimmers 1016a-c may be trimmed. This may result in an improved condition number after recalibration.

All the waveguides and MMI couplers may be fabricated using a single mask. Fabrication tolerances may be such that once the desired amplitudes and/or phases have been determined, the modulator yield will not be significantly degraded by unsuitably high condition numbers after calibration, in which case trimmers may not be required. The alternative is a design where each modulator or each production run might require adjustment of the trimmers to reduce condition numbers and improve the yield.

In the exemplary modulator 1000 of FIG. 10, the bias errors for each of the I bias, Q bias and P bias may be determined by:

$$\varepsilon_{3\times1} = A_{3\times4}(p_{4\times1} - s_{4\times1})$$

Where:

$\varepsilon_{3\times1}$ is the vector of the bias errors $\begin{bmatrix} I \text{ biasing error} \\ Q \text{ biasing error} \\ P \text{ biasing error} \end{bmatrix}$;

$p_{4\times1}$ is the vector of the photocurrents at the outputs 1-4 of the second MMI coupler 1014, divided by the sum of those photocurrents;

$A_{3\times4}$ is a detector matrix determined during a calibration of the modulator 1000; and $s_{4\times1}$ is a set point vector determined during a calibration of the modulator 1000.

The configuration of FIG. 10 leads to the best condition number, around 1.6 after optimizing the trimmers. By making both MMI couplers 4×4, a single design of MMI can be reused taking advantage of the existing 4×4 design developed for Oclaro's coherent receiver.

Figure 11:
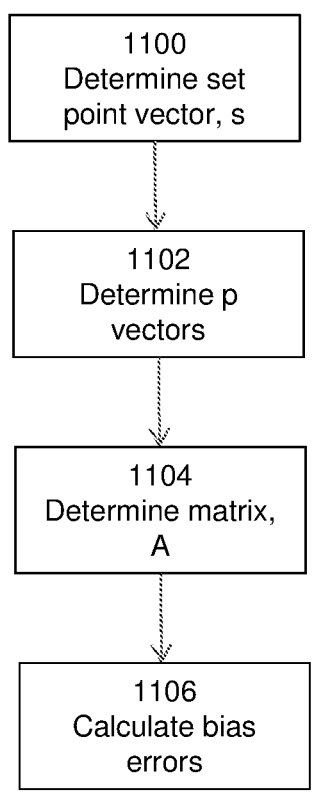
FIG. 11 shows a method for determining an error in at least one bias signal in a MZ modulator.

FIG. 11 shows a method for determining error signals in at least one bias voltage for a MZ modulator.

Calibration begins by determining 1100 the set point vector s. Firstly the bias feedback loops are turned off and any method is used to set the I bias, Q bias, and P bias to optimize the output of the modulator. For example, I, Q, and P biases might be set by trial and error while monitoring the output of the modulator using an optical modulation analyser to assess the transmitted eye opening and constellation quality. This determines a set of I, Q, and P biases that produce the best modulation. Under this condition, s=p, the vector of the photocurrents at the outputs 1-4 of the second MMI coupler 914, divided by the sum of those photocurrents. A note is also made of the ideal biases $I_0$, $Q_0$, and $P_0$, for use later in the calibration.

The detector matrix A is then determined using multivariate linear regression. Note that all the PD signals become nonlinear for very large bias errors. In order for linear regression to work, the bias errors should be small enough that the PD signals change approximately linearly with respect to changes in bias. Typically, the bias errors are in a range of $\pm V\pi/10$, so this requirement is easily met. During calibration the bias errors are controlled directly and can be kept small enough to fit this condition. During operation, only small drifts in the modulator characteristics are expected so that bias changes from the initial set point will be small. The four PD signals divided by their sum are the elements of the vector p. The PD signals are divided by their sum (normalized) to keep the result independent of optical power.

element $p_i = PD_i/(\text{sum of 4 } PD_i)$, for $i = 1 \ldots 4$

In circumstances in which the laser power does not change significantly, e.g. because of a power-control feedback loop, then normalization of the PD signals may not be required. However, since the bias errors are linear functions of p−s, and s never changes after calibration, normalization may be a preferred option.

The p vectors are measured 1102 at three linearly independent sets of bias conditions. The most direct way to do this is to change each of the three biases by a known small amount, measuring a new p−s each time. For example, the biases can be set to $I_0+dI$, $Q_0$, and $P_0$, corresponding to a first known error vector:

$$\varepsilon_1 = \begin{bmatrix} dI \\ 0 \\ 0 \end{bmatrix}$$

The 4×1 vector $v_1 = p - s$ can then be measured, where p is the vector of the photocurrents at the outputs 1-4 of the second MMI coupler 914, divided by the sum of those photocurrents, and s is the previously-determined set point vector.

The vector $v_2$ can then be measured at biases of $I_0$, $Q_0+dQ$, and $P_0$ corresponding to $$\varepsilon_2 = \begin{bmatrix} 0 \\ dQ \\ 0 \end{bmatrix};$$

and the vector $v_3$ can be measured at biases of $I_0$, $Q_0$, and $P_0+dP$ corresponding to $$\varepsilon_3 = \begin{bmatrix} 0 \\ 0 \\ dP \end{bmatrix}.$$

The column vectors $\varepsilon_n$ and $v_n$ are then grouped to form matrices, and the detector matrix A is calculated 1104 using a pseudo-inverse, aka Moore-Penrose inverse:

$$A = [\varepsilon_1 \ \varepsilon_2 \ \varepsilon_3][v_1 \ v_2 \ v_3]^{-1} = \begin{bmatrix} dI & 0 & 0 \\ 0 & dQ & 0 \\ 0 & 0 & dP \end{bmatrix} [v_1 \ v_2 \ v_3]^{-1}.$$

The bias errors are calculated 1106 using A, p and s and may be fed back to the I, Q and P bias circuits to correct the bias voltages applied by those circuits to the modulator 1000.

The exemplary modulator 1000 may be configured to transmit the output vector p into a bias signal determiner 1016. The bias signal determiner 1016 may comprise at least one memory 1018 and at least one processor 1020. The memory 1018 may comprise a non-volatile memory and/or a volatile memory. The memory 1018 may have a computer program 1022 stored therein. The computer program 1022 may be configured to undertake the methods disclosed herein. The computer program 1022 may be loaded in the memory 1018 from a non-transitory computer readable medium 1024, on which the computer program is stored. The processor 1020 is configured to undertake at least the function of determining the bias signal for each bias electrode based on the bias error vector p, as set out herein.

The exemplary modulator 1000 provides the following advantages: no light is wasted by tapping off light via couplers, as in current modulators; the photocurrent measured in the vector p at the outputs of the second MMI coupler 1014 are high, which increases the signal to noise ratio; and that calibration is independent of variations in laser power.

Figure 12:
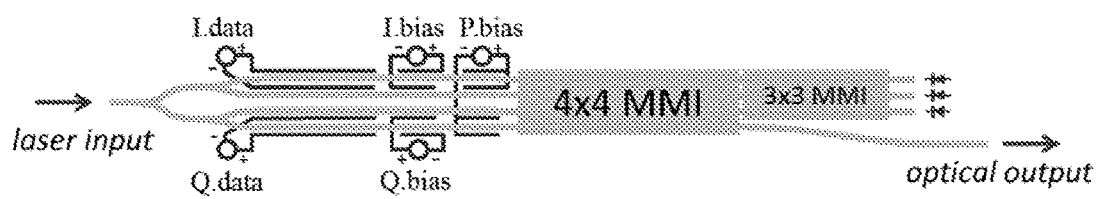
FIG. 12 shows a schematic representation of an I & Q MZ modulator.

As shown in FIG. 12, the second MMI coupler may be a 3×3 MMI coupler (i.e. three inputs and three outputs) and no trimmers may be positioned between the first MMI and the second MMI. This is in some ways the simplest approach since only three PDs are needed, trimmers are eliminated, and the two MMI couplers can be combined into a single device with four input waveguides, a single main output waveguide exiting near the center, and three output waveguides to the monitor PDs. Modelling predicts a condition number (see the section on calibration) of around 53.

Figure 13:
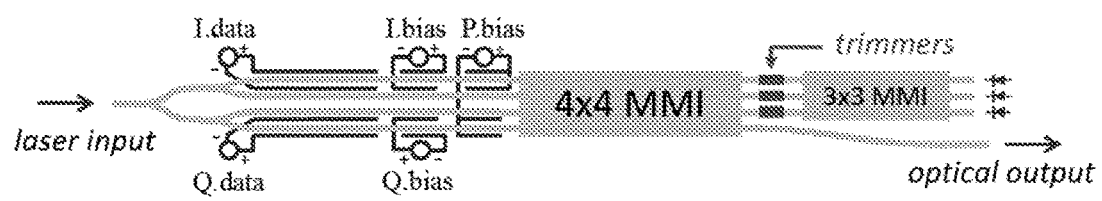
FIG. 13 shows a schematic representation of an I & Q MZ modulator.

As shown in FIG. 13, the second MMI coupler may be a 3×3 MMI coupler and trimmers may be positioned between the first MMI and the second MMI. This approach requires the two MMI couplers to be separated, and still uses three monitor PDs. After optimizing the trimmers, modelling predicts a condition number of around 22.

Any of the optical modulators described herein can be used in a pair, with the two optical outputs multiplexed using a polarization combiner. The resulting dual-polarization signal may then carry twice the data rate of each of the individual modulators.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A Mach-Zehnder, MZ, modulator for modulating optical signals, and comprising:
a plurality of modulating waveguide sections;
at least one bias electrode in electrical communication with at least one modulating waveguide section and configured to apply at least one electrical bias signal to one or more of the modulating waveguide sections;
an output optical combiner comprising a plurality of inputs and a plurality of outputs, wherein the plurality of inputs of the combiner are in optical communication with output sides of the plurality of modulating waveguide sections, and wherein a plurality of the outputs of the combiner are monitor outputs; and
wherein the combiner is an n×n combiner and n is greater than 2.

2. The modulator according to claim 1, further comprising a bias signal determiner configured to determine an error in the at least one electrical bias signal based on a signal received from the plurality of monitor outputs of the combiner.

3. The modulator according to claim 2, wherein the bias signal determiner is configured to determine the error based on a difference between two of the monitor outputs of the combiner.

4. The modulator according to claim 1, wherein the combiner is a 3×3 combiner, and wherein one of the plurality of inputs of the 3×3 combiner is in optical communication with a combined output of the modulating waveguide sections.

5. The modulator according to claim 2, the modulator further comprising a further n×n combiner comprising a plurality of inputs and a plurality of outputs, wherein a plurality of the inputs of the further combiner are in optical communication with one or more of the monitor outputs of the combiner, and wherein the bias signal determiner is configured to determine the error in the at least one electrical bias signal based on a signal received from the plurality of outputs of the further combiner.

6. An I & Q modulator arrangement comprising a plurality of MZ modulators according to claim 2 nested within an outer MZ structure, wherein the bias signal determiner is configured to determine an error in each of an I and a Q electrical bias signal.

7. The I & Q modulator arrangement according to claim 6 wherein the outer MZ structure comprises an optical combiner having a plurality of monitor outputs for determining an error in the outer phase electrical bias signal.

8. The modulator according to claim 1 and comprising four modulating waveguide sections, wherein the output optical combiner comprises four inputs and each of the modulating waveguide sections is in optical communication to an input of the combiner.

9. The modulator according to claim 8, wherein the combiner comprises four outputs.

10. The modulator according to claim 2, wherein the bias signal determiner is configured to determine the error in at least one electrical bias signal based on:

$$\varepsilon = A(p-s)$$

wherein $\varepsilon$ is a vector of an error in the electrical bias signal, A is a detector matrix determined during a calibration of the modulator, p comprises a vector of the outputs of a further combiner and s is a set point vector determined during a calibration of the modulator.

11. The modulator according to claim 10, wherein p comprises the vector of the outputs of the further combiner divided by the sum of those outputs.

12. The modulator according to claim 10, wherein the bias signal determiner is configured to determine the vector s while the bias signals are set to optimize the output of the modulator.

13. The modulator according to claim 10, wherein the bias signal determiner is configured to determine the matrix A by determining p-s while the bias signals are set to each of three linearly independent sets of bias conditions and determining a pseudo inverse by:

$$A = [\varepsilon_1 \; \varepsilon_2 \; \varepsilon_3][v_1 \; v_2 \; v_3]^{-1} = \begin{bmatrix} dI & 0 & 0 \\ 0 & dQ & 0 \\ 0 & 0 & dP \end{bmatrix} [v_1 \; v_2 \; v_3]^{-1}.$$

14. The modulator according to claim 5, wherein the outputs of the further combiner are measured using at least one photodetector configured to transmit the measured signals to the bias signal determiner.

15. The modulator according to claim 10, wherein
the combiner is an n×n combiner and n is greater than 2, the modulator further comprising a further n×n combiner comprising a plurality of inputs and a plurality of outputs, wherein a plurality of the inputs of the further combiner are in optical communication with one or more of the monitor outputs of the combiner,
the bias signal determiner is configured to determine the error in the at least one electrical bias signal based on a signal received from the plurality of outputs of the further combiner; and
the combiner is in optical communication with the further combiner via at least one trimmer.

16. The modulator according to claim 6, wherein the combiner and/or a further combiner comprises a multimode interference, MMI, combiner.

17. A Mach-Zehnder modulator comprising a plurality of nested modulators according to claim 6.

18. A method for determining an error in at least one electrical bias signal in a Mach-Zehnder modulator, the modulator comprising a plurality of modulating waveguide sections and at least one bias electrode in electrical communication with at least one modulating waveguide section and configured to apply at least one electrical bias signal to one or more of the modulating waveguide sections, the method comprising:
receiving an optical signal at an output optical combiner in optical communication with output sides of the plurality of modulating waveguide sections and propagating the optical signal through the combiner to a plurality of outputs thereof;
providing an optical output of the modulator at one output of the combiner and a plurality of monitor outputs at a plurality of the remainder of the plurality of outputs of the combiner, wherein the combiner is an n×n combiner and n is greater than 2; and
determining an error in the at least one electrical bias signal based on the received monitor outputs.

19. The method according to claim 18, wherein the error in the at least one electrical bias signal is determined at a bias signal determiner.

20. The method according to claim 19, further comprising the bias signal determiner determining the error based on a difference between two of the monitor outputs of the combiner.

21. The method according to claim 18, wherein the combiner is a 3×3 combiner, and wherein the optical signal is received at one of the plurality of inputs of the 3×3 combiner from a combined output of the modulating waveguide sections.

22. The method according to claim 19, further comprising receiving the plurality of monitor outputs at a plurality of inputs of a further combiner, propagating remaining optical signals to a plurality of outputs thereof and determining, by the bias signal determiner, the error in the at least one electrical bias signal based on a signal received from the plurality of outputs of the further combiner.

23. The method according to claim 19, wherein the modulator is an I & Q modulator arrangement comprising a plurality of modulators nested within an outer MZ modulator structure, an in phase, I, bias electrode and a quadrature phase, Q, bias electrode, the bias signal determiner determining an error in the I and Q electrical bias signals.

24. The method according to claim 23, wherein the outer MZ structure comprises an optical combiner having a plurality of monitor outputs and a phase bias electrode, the bias signal determiner determining an error in the phase electrical bias signal based on the plurality of monitor outputs.

25. The method according to claim 19, wherein the modulator comprises four modulating waveguide sections, and wherein the output optical combiner comprises four inputs and each of the modulating waveguide sections is in optical communication with an input of the combiner.

26. The method according to claim 25, wherein the combiner comprises four outputs.

27. The method according to claim 19, wherein the bias signal determiner determines the error in at least one electrical bias signal based on:

$$\varepsilon = A(p-s)$$

wherein ε is a vector of an error in the electrical bias signal, A is a detector matrix determined during a calibration of the modulator, p comprises a vector of the outputs of a further combiner, and s is a set point vector determined during a calibration of the modulator.

28. The method according to claim 27, wherein p comprises the vector of the outputs of the further combiner divided by the sum of those outputs.

29. The method according to claim 27, wherein the bias signal determiner determines the vector s while the bias signals are set to optimize the output of the modulator.

30. The method according to claim 27, wherein the bias signal determiner determines the matrix A by determining p-s while the bias signals are set to each of three linearly independent sets of bias conditions and determining a pseudo inverse by:

$$A = [\varepsilon_1 \; \varepsilon_2 \; \varepsilon_3][v_1 \; v_2 \; v_3]^{-1} = \begin{bmatrix} dI & 0 & 0 \\ 0 & dQ & 0 \\ 0 & 0 & dP \end{bmatrix} [v_1 \; v_2 \; v_3]^{-1}.$$

31. The method according to claim 19, wherein remaining optical signals output from a further combiner are measured using at least one photodetector, the measured signals being transmitted to the bias signal determiner.

32. The method according to claim 19, wherein the bias signal determiner determines the error in at least one electrical bias signal based on:

$$\varepsilon = A(p-s)$$

wherein ε is a vector of an error in the electrical bias signal, A is a detector matrix determined during a calibration of the modulator, p comprises a vector of the outputs of a further combiner and s is a set point vector determined during a calibration of the modulator;

and wherein the combiner is in optical communication with the further combiner via at least one trimmer.

33. A non-transitory computer-readable storage medium comprising instructions for determining an error in at least one electrical bias signal in a Mach-Zehnder modulator, the modulator comprising a plurality of modulating waveguide sections and at least one bias electrode in electrical communication with at least one modulating waveguide section and configured to apply at least one electrical bias signal to one or more of the modulating waveguide sections, the instructions to be executed by a computer processor of a computer system to carry out the steps of:

receiving an optical signal at an output optical combiner in optical communication with output sides of the plurality of modulating waveguide sections and propagating the optical signal through the combiner to a plurality of outputs thereof;

providing an optical output of the modulator at one output of the combiner and a plurality of monitor outputs at a plurality of the remainder of the plurality of outputs of the combiner, wherein the combiner is an n×n combiner and n is greater than 2; and determining an error in the at least one electrical bias signal based on the received monitor outputs.

* * * * *